(12) United States Patent
Baba

(10) Patent No.: US 9,104,065 B2
(45) Date of Patent: Aug. 11, 2015

(54) LIQUID CRYSTAL DISPLAY DEVICE

(75) Inventor: Masashi Baba, Chiba (JP)

(73) Assignee: Panasonic Liquid Crystal Display Co., Ltd., Hyogo (JP)

( * ) Notice: Subject to any disclaimer, the term of this patent is extended or adjusted under 35 U.S.C. 154(b) by 197 days.

(21) Appl. No.: 13/306,497

(22) Filed: Nov. 29, 2011

(65) Prior Publication Data

US 2012/0140146 A1 Jun. 7, 2012

(30) Foreign Application Priority Data

Dec. 2, 2010 (JP) ................................. 2010-269279

(51) Int. Cl.
*G02F 1/1335* (2006.01)

(52) U.S. Cl.
CPC .... *G02F 1/133606* (2013.01); *G02F 1/133603* (2013.01); *G02F 1/133608* (2013.01); *G02F 2001/133607* (2013.01)

(58) Field of Classification Search
CPC ................... G02F 1/133604; G02F 1/133606; G02F 1/133608; G02F 1/133611; G02F 2001/133607
USPC ...................................................... 349/61–69
See application file for complete search history.

(56) References Cited

U.S. PATENT DOCUMENTS

| 7,787,073 B2* | 8/2010 | Bang ............................... 349/61 |
| 2007/0097705 A1 | 5/2007 | Jung |
| 2007/0109779 A1 | 5/2007 | Sekiguchi et al. |
| 2007/0247833 A1 | 10/2007 | Lee et al. |
| 2008/0316391 A1* | 12/2008 | Hsiao ............................... 349/61 |
| 2010/0165246 A1* | 7/2010 | Sekiguchi et al. ............... 349/62 |
| 2010/0226136 A1 | 9/2010 | Murakoshi et al. |
| 2010/0271565 A1* | 10/2010 | Suminoe et al. ................. 349/61 |
| 2011/0013377 A1 | 1/2011 | Kim |
| 2011/0267559 A1 | 11/2011 | Sekiguchi et al. |
| 2012/0092592 A1* | 4/2012 | Imajo et al. ...................... 349/62 |
| 2012/0105763 A1* | 5/2012 | Takeuchi et al. ................. 349/61 |
| 2012/0188486 A1* | 7/2012 | Baba et al. ....................... 349/67 |

FOREIGN PATENT DOCUMENTS

| CN | 1963289 | 5/2007 |
| CN | 101060147 | 10/2007 |
| JP | 2007-042511 | 2/2007 |
| JP | 2007-286627 | 11/2007 |
| JP | 2008-096765 | 4/2008 |
| JP | 2009-044099 | 2/2009 |
| JP | 2010-092686 | 4/2010 |
| JP | 2010-205868 | 9/2010 |
| WO | 2009/022661 | 2/2009 |
| WO | 2009/035272 | 3/2009 |
| WO | 2010/134408 | 11/2010 |

* cited by examiner

*Primary Examiner* — Dung Nguyen
(74) *Attorney, Agent, or Firm* — Hamre, Schumann, Mueller & Larson, P.C.

(57) ABSTRACT

Provided is a liquid crystal display device (1), including: a liquid crystal panel (2); and a backlight unit (4), which is disposed on a rear surface of the liquid crystal panel (2) and includes a light source substrate (42) onto which a plurality of light sources are mounted and a casing (49), in which: the plurality of light sources are arranged along one direction, and at least one of the plurality of light sources is disposed so as to be offset in a direction orthogonal to the one direction with respect to at least another one of the plurality of light sources; and the backlight unit further includes a fixture (50) for fixing the light source substrate (42) onto the casing (49), the fixture being disposed on a side of the offset light source in an opposite direction to an offset direction.

12 Claims, 14 Drawing Sheets

LIQUID CRYSTAL DISPLAY DEVICE

CROSS-REFERENCE TO RELATED APPLICATION

The present application claims priority from Japanese application JP 2010-269279 filed on Dec. 2, 2010, the content of which is hereby incorporated by reference into this application.

BACKGROUND OF THE INVENTION

1. Field of the Invention

The present invention relates to a liquid crystal display device.

2. Description of the Related Art

JP 2007-286627 A discloses a liquid crystal display device including a direct type backlight unit. In the liquid crystal display device, a plurality of light emitting diodes (LEDs) are used as light sources of the backlight unit. The LEDs are disposed in matrix across an entire region of the backlight unit.

In the liquid crystal display device described in JP 2007-286627 A, the LEDs are disposed across the entire region of the backlight unit, and hence the size of a substrate on which a large number of LEDs are disposed needs to be large enough to cover the entire region of the backlight unit. This increases cost for preparing a large number of LEDs as well as a material cost of the substrate on which the LEDs are to be disposed.

SUMMARY OF THE INVENTION

The present invention has been made in view of the above-mentioned problem, and has an object to provide a liquid crystal display device capable of reducing the number of light sources in a backlight unit and reducing a material cost of a substrate on which the light sources are to be disposed.

Representative aspects of the invention disclosed herein are briefly outlined as follows.

(1) There is provided a liquid crystal display device, including: a liquid crystal panel; and a backlight unit, which is disposed on a rear surface of the liquid crystal panel and includes a light source substrate onto which a plurality of light sources are mounted and a casing, in which: the plurality of light sources are arranged along one direction, and at least one of the plurality of light sources is disposed so as to be offset in a direction orthogonal to the one direction with respect to at least another one of the plurality of light sources; and the backlight unit further includes a fixture for fixing the light source substrate onto the casing, the fixture being disposed on a side of the offset light source in an opposite direction to an offset direction.

(2) In the liquid crystal display device according to the above-mentioned item (1), the plurality of light sources and the fixture are disposed at positions that overlap one another in the one direction.

(3) In the liquid crystal display device according to the above-mentioned item (1) or (2), each of the plurality of light sources includes a light source element and a lens which is disposed in front of the light source element, and the lens has a shape asymmetric in the direction orthogonal to the one direction about an optical axis direction of the light source element.

(4) In the liquid crystal display device according to any one of the above-mentioned items (1) to (3), the plurality of light sources are arranged in two rows in the one direction so as to be disposed alternately in the direction orthogonal to the one direction.

(5) In the liquid crystal display device according to any one of the above-mentioned items (1) to (3), the plurality of light sources are arranged in three rows in the one direction so as to be disposed in a wavelike fashion in the direction orthogonal to the one direction.

(6) In the liquid crystal display device according to any one of the above-mentioned items (1) to (3), the plurality of light sources are arranged in the one direction so as to be offset in the direction orthogonal to the one direction irregularly.

(7) There is provided a liquid crystal display device, including: a liquid crystal panel; and a backlight unit, which is disposed on a rear surface of the liquid crystal panel and includes a light source substrate onto which a plurality of light sources are mounted and a casing, in which the plurality of light sources are arranged along one direction, and the backlight unit further includes a fixture for fixing the light source substrate and a fixing plate to each other, the fixture being disposed outside the light source substrate in plan view.

According to the above-mentioned invention disclosed herein, in the liquid crystal display device, it is possible to reduce the number of light sources in the backlight unit and reduce the material cost of the substrate on which the light sources are to be disposed.

DETAILED DESCRIPTION OF THE INVENTION

Figure 1:
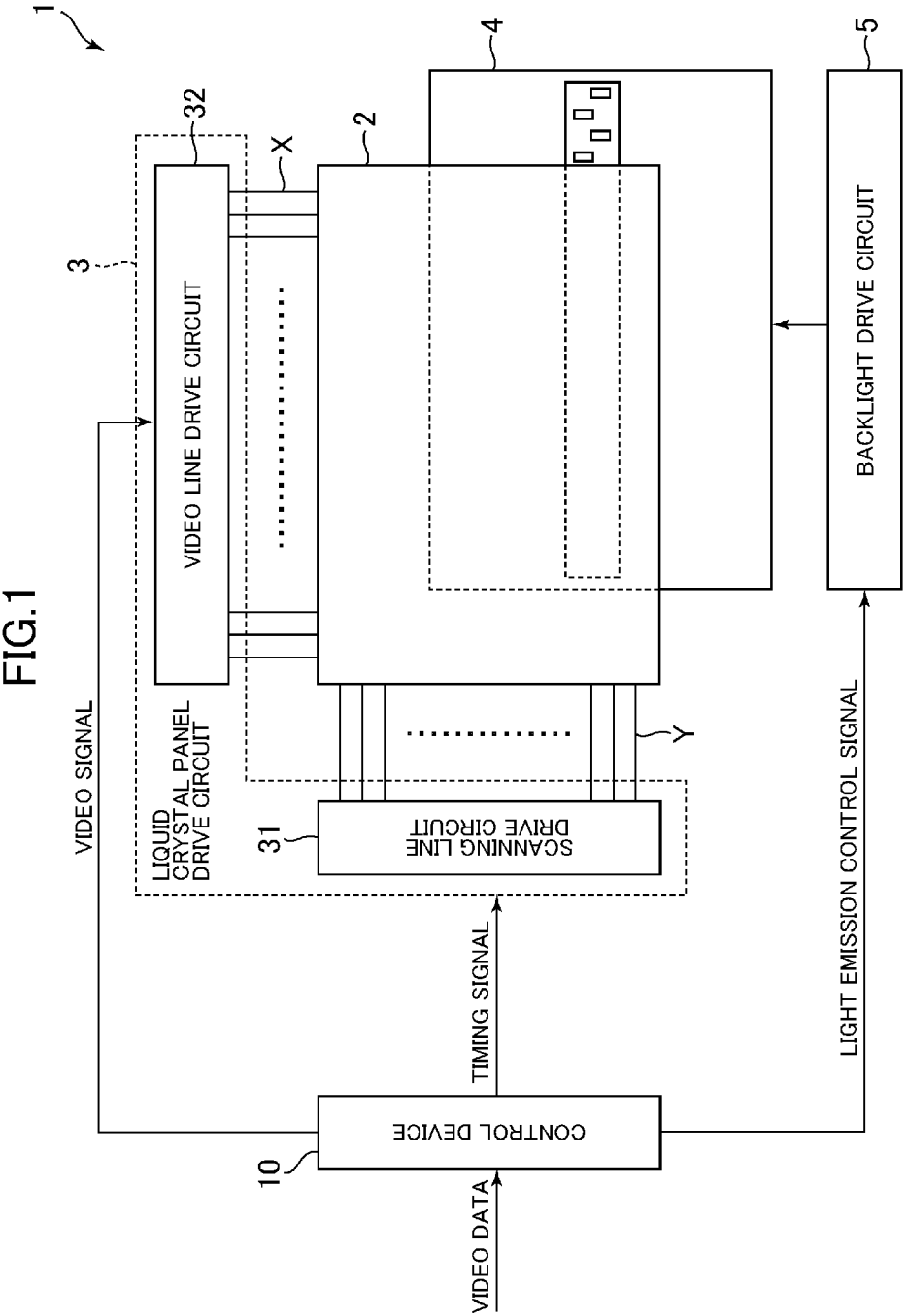
FIG. 1 is a diagram illustrating a configuration of a liquid crystal display device according to a first embodiment of the present invention.
Figure 2:
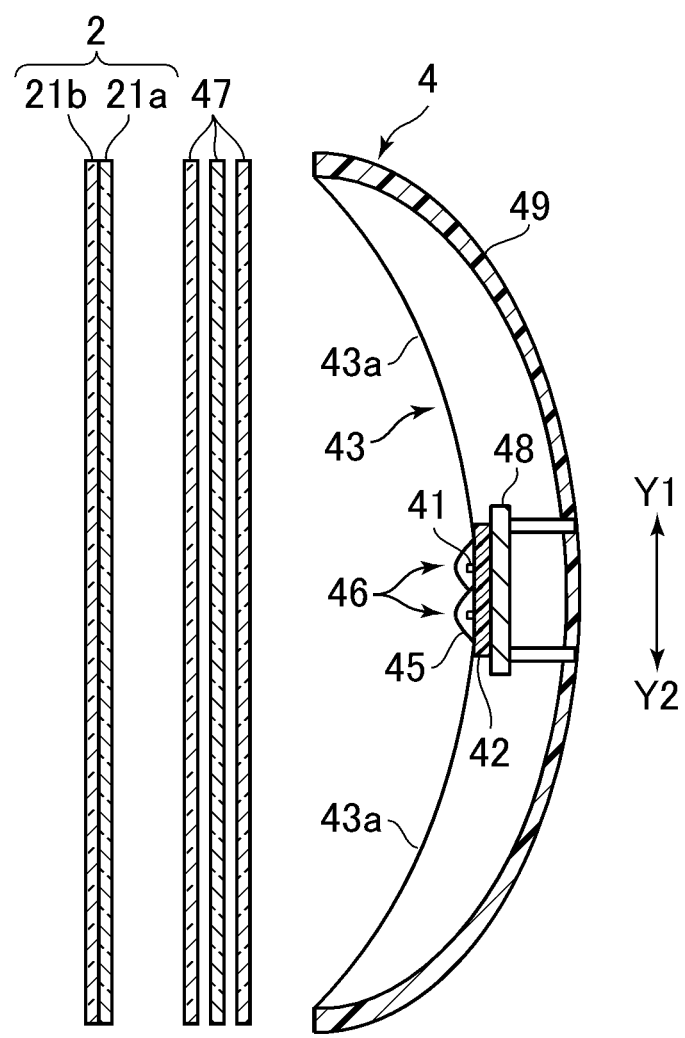
FIG. 2 is a schematic cross-sectional view of a liquid crystal panel and a backlight unit included in the liquid crystal display device according to the first embodiment.
Figure 3:
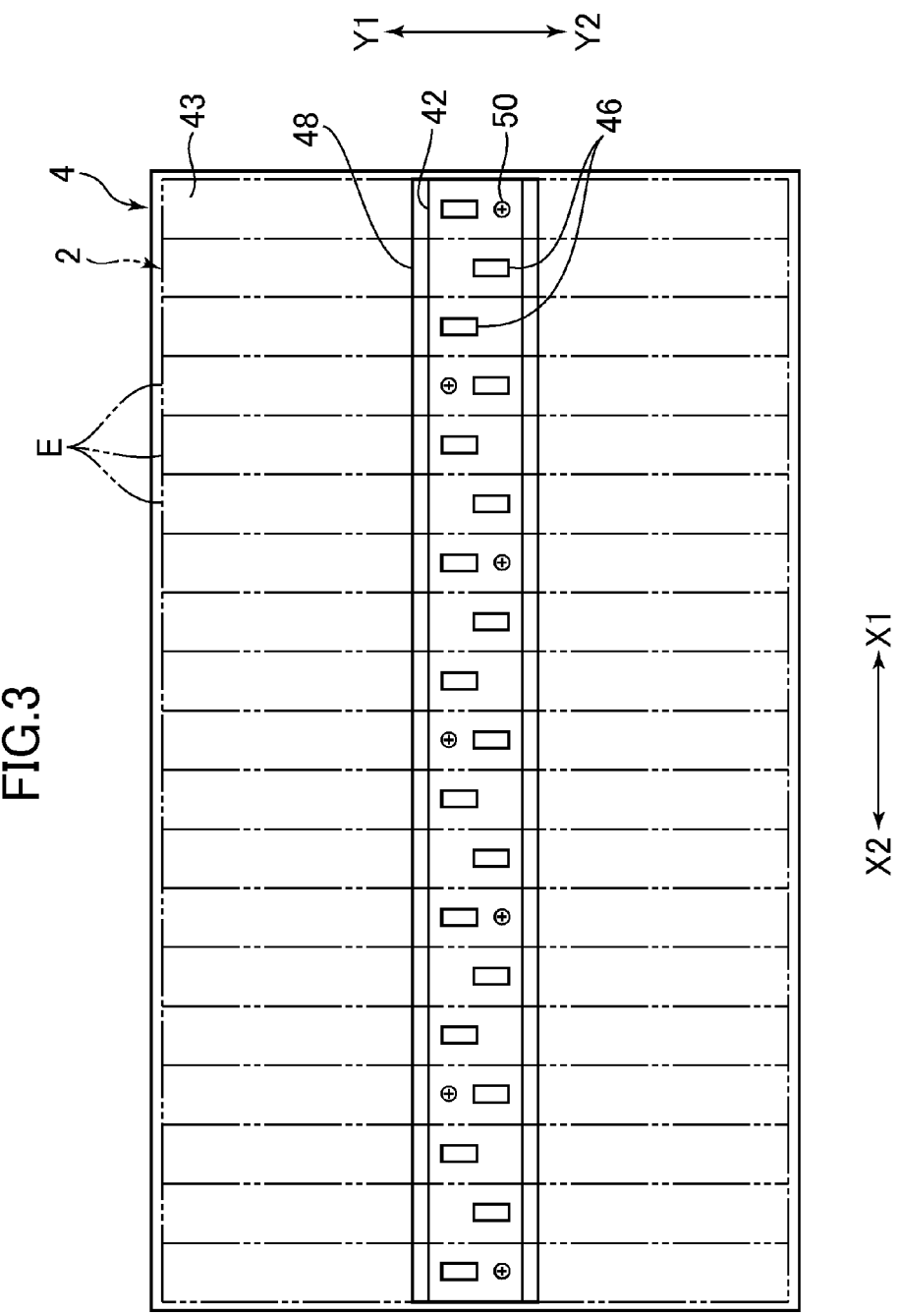
FIG. 3 is a front view of the backlight unit included in the liquid crystal display device according to the first embodiment.
Figure 4:
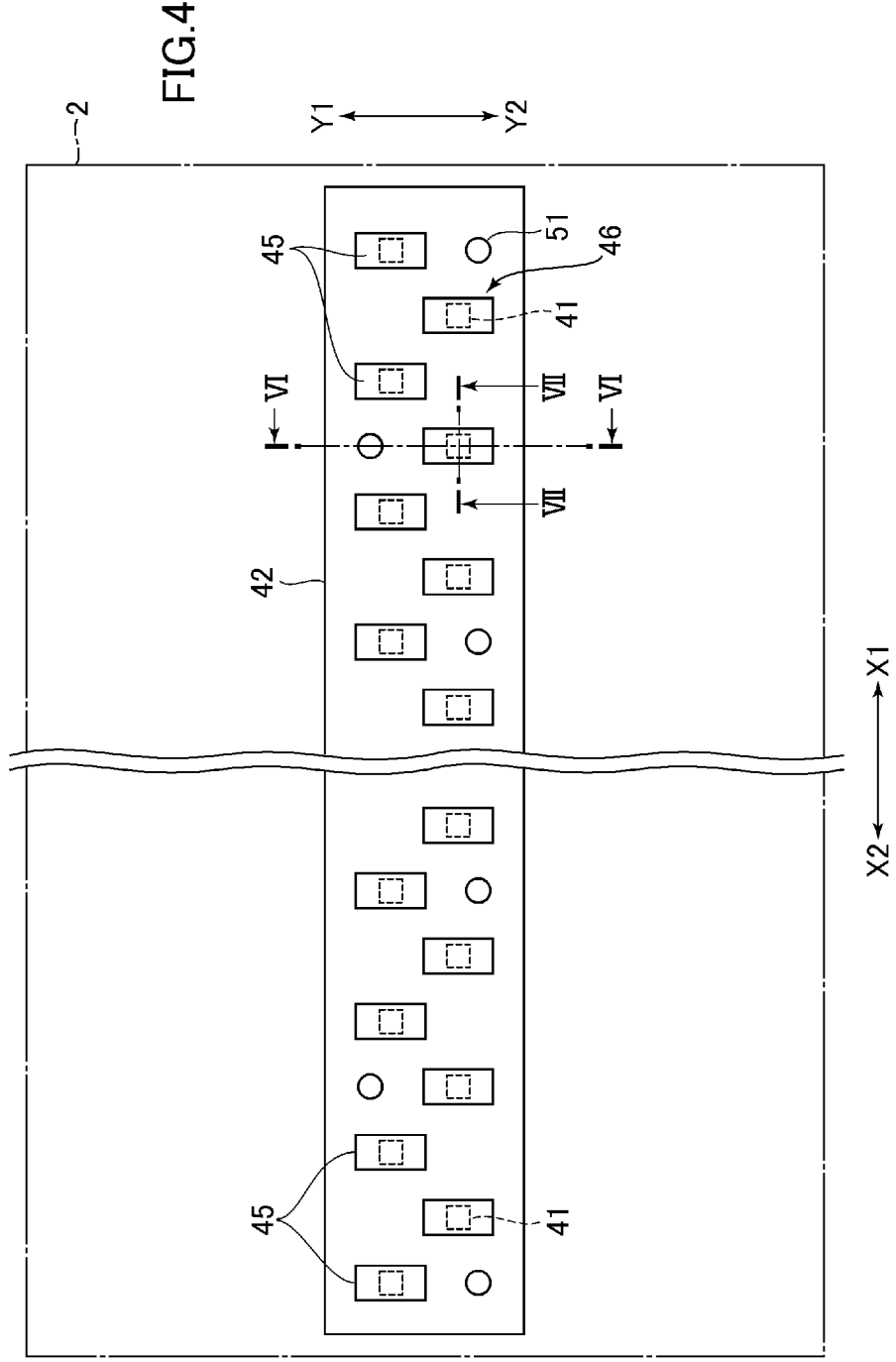
FIG. 4 is a front view of a light source substrate provided in the backlight unit of the liquid crystal display device according to the first embodiment.

Hereinafter, a first embodiment of the present invention is described with reference to the drawings. FIG. 1 is a diagram illustrating a configuration of a liquid crystal display device 1 according to the first embodiment of the present invention. FIG. 2 is a schematic cross-sectional view of a liquid crystal panel 2 and a backlight unit 4 included in the liquid crystal display device 1 according to the first embodiment. FIG. 3 is a front view of the backlight unit 4 included in the liquid crystal display device 1 according to the first embodiment, and FIG. 4 is a front view of a light source substrate 42 provided in the backlight unit 4 of the liquid crystal display device 1 according to the first embodiment.

As illustrated in FIGS. 1 and 2, the liquid crystal display device 1 includes a control device 10, the liquid crystal panel 2, and a liquid crystal panel drive circuit 3. The liquid crystal panel drive circuit 3 includes a scanning line drive circuit 31 and a video line drive circuit 32. Further, the liquid crystal display device 1 includes the backlight unit 4 and a backlight drive circuit 5.

The liquid crystal panel 2 has a rectangular shape, and the width of the liquid crystal panel 2 in a lateral direction (X1-X2 direction illustrated in FIG. 3) is larger than the width thereof in a vertical direction (Y1-Y2 direction illustrated in FIG. 3).

The liquid crystal panel 2 includes a pair of transparent substrates (see FIG. 2). On a TFT substrate 21a as one of the transparent substrates, a plurality of video signal lines X and a plurality of scanning signal lines Y are formed. The video signal lines X and the scanning signal lines Y are provided orthogonal to each other to form a grid pattern. A region surrounded by adjacent two video signal lines X and adjacent two scanning signal lines Y corresponds to one pixel. Further, in each of the pixels, a thin film transistor (TFT) (not shown) is provided. The TFT is turned ON by a scanning signal input from the scanning signal line Y, to thereby apply, to an electrode of each of the pixels, a voltage (signal representing a gradation value for each of the pixels) applied via the video signal line X.

A color filter is formed on a color filter substrate 21b as the other of the transparent substrates. Liquid crystal (not shown) is sealed between the TFT substrate 21a and the color filter substrate 21b. Polarization filters (not shown) are adhered to a display surface of the liquid crystal panel 2 and a rear surface thereof, which is a surface on a side opposite to the display surface, respectively.

Note that, the transparent substrates of this embodiment are formed of glass, but other materials such as a resin may be used.

Into the control device 10, video data received by a tuner or an antenna (not shown) or video data generated in a different device such as a video reproducing device is input. The control device 10 includes a central processing unit (CPU) and a memory such as a read only memory (ROM) and a random access memory (RAM). The control device 10 performs various types of image processing, such as color adjustment, with respect to the input video data, and generates a video signal representing a gradation value for each of the pixels. The control device 10 outputs the generated video signal to the video line drive circuit 32. Further, the control device 10 generates, based on the input video data, a timing signal for synchronizing the video line drive circuit 32, the scanning line drive circuit 31, and the backlight drive circuit 5, and outputs the generated timing signal to the respective drive circuits.

Further, as described later, the backlight unit 4 is provided with a plurality of LED elements 41 (see FIG. 4). The control device 10 generates a signal for controlling the brightness of the LED element 41 based on the input video data. Then, the control device 10 outputs the generated signal to the backlight drive circuit 5. In accordance with the generated signal, the backlight drive circuit 5 controls an amount of current flowing through the LED element 41, to thereby adjust the brightness for each of the LED elements 41.

The scanning line drive circuit 31 is connected to the scanning signal lines Y formed on the TFT substrate 21a. The scanning line drive circuit 31 selects one of the scanning signal lines Y in order in response to the timing signal input from the control device 10, and the selected scanning signal line Y is applied with a voltage. When the voltage is applied to the scanning signal line Y, the TFTs connected to the scanning signal line Y are turned ON.

The video line drive circuit 32 is connected to the video signal lines X formed on the TFT substrate 21a. In conformity to the selection of the scanning signal line Y by the scanning line drive circuit 31, the video line drive circuit 32 applies, to each of the TFTs provided to the selected scanning signal line Y, a voltage corresponding to the video signal representing the gradation value of each of the pixels.

The backlight unit 4 is provided on the rear surface side of the liquid crystal panel 2. The backlight unit 4 also has a rectangular shape, and the size thereof is set accordingly to that of the liquid crystal panel 2. Similarly to the liquid crystal panel 2, the width of the backlight unit 4 in the lateral direction is larger than the width thereof in the vertical direction.

As illustrated in FIGS. 2 and 4, the backlight unit 4 includes the plurality of LED elements 41, and the rear surface of the liquid crystal panel 2 is irradiated with light emitted therefrom. Each of the LED elements 41 includes an LED chip, a reflector for reflecting the light emitted from the LED chip, and an encapsulation resin, which encapsulates the LED chip and has light transmissive property. Further, in this embodiment, a lens 45 is disposed in front of each LED element 41. Hereinafter, the LED element 41 and the lens 45 disposed in front thereof are collectively referred to as LED module 46. A light source of this embodiment is the LED module 46. Further, the LED element 41 is a light source element.

As illustrated in FIGS. 3 and 4, the backlight unit 4 includes the light source substrate 42, which is an elongated substrate onto which the plurality of LED modules 46 are mounted. The plurality of LED modules 46 are arranged along one direction, here, a longitudinal direction of the light source substrate 42 (X1-X2 direction), so as not to be arranged in line. In other words, at least one of the plurality of LED modules 46 is disposed so as to be offset with respect to at least another one LED module 46 in a direction orthogonal to the longitudinal direction of the light source substrate 42 (Y1-Y2 direction, hereinafter, referred to as width direction of the light source substrate 42). In the example described here, the plurality of LED modules 46 are arranged in two rows in the longitudinal direction of the light source substrate 42 so as to be alternately disposed in the width direction of the light source substrate 42. The material of the light source substrate 42 is not particularly limited as long as the material is an insulating material, and the light source substrate 42 may be formed of an insulating material such as glass epoxy, paper phenol, and paper epoxy or may be formed of a metal with insulating coating. The backlight unit 4 is a direct type backlight unit, and the light source substrate 42 is disposed so as to face the rear surface of the liquid crystal panel 2.

As illustrated in FIG. 3, the light source substrate 42 is disposed so that the longitudinal direction thereof is the direction along the edges of the liquid crystal panel 2. In the example described here, the light source substrate 42 is elongated in the lateral direction, and the longitudinal direction of the light source substrate 42 is the direction along the upper and lower edges of the liquid crystal panel 2. Further, the light source substrate 42 is disposed substantially at a center position in the vertical direction of the backlight unit 4. As a result, the liquid crystal panel 2 includes, at the center portion in the vertical direction thereof, a region provided face to face with the light source substrate 42, and includes, at upper and lower portions thereof, regions provided not face to face with the light source substrate 42. Therefore, the length of the light source substrate 42 in the longitudinal direction thereof is substantially equal to the length of the liquid crystal panel 2 in a corresponding direction, whereas the length of the light source substrate 42 in the width direction thereof is shorter than a corresponding length of the liquid crystal panel 2.

As illustrated in FIG. 2, the backlight unit 4 includes a casing 49 forming the rear surface of the backlight unit 4. The casing 49 in this example is curved so that the center in the vertical direction thereof protrudes toward the rear side. The light source substrate 42 is supported by the casing 49. Specifically, the light source substrate 42 is mounted to a fixing plate 48, and the fixing plate 48 is fixed on the inner side of the casing 49.

The light source substrate 42 and the fixing plate 48 are fixed to each other with the use of fixtures 50 illustrated in FIG. 3. In this embodiment, the fixtures 50 are screws. Then, as illustrated in FIG. 3, the fixtures 50 are each disposed on the side of the offset LED module 46 in an opposite direction to the offset direction. Specifically, among the LED modules 46 illustrated in FIG. 3, the LED module 46 positioned on the rightmost of FIG. 3 is offset in the upward direction of FIG. 3 with respect to the light source substrate 42 or an adjacent LED module 46. Then, the fixture 50 is disposed on the side of that LED module 46 in the opposite direction to the offset direction, that is, on the lower side of FIG. 3. Regarding the positional relation between the LED modules 46 and the fixtures 50 in the longitudinal direction of the light source substrate 42, the LED modules 46 and the fixtures 50 are disposed at positions that overlap one another in the longitudinal direction of the light source substrate 42. The arrangement of the LED modules 46 and the fixtures 50 in this way shortens the length that the LED module 46 and the fixture 50 occupy in the width direction of the light source substrate 42, as compared to the case where the LED modules 46 are disposed in line and the fixtures 50 are provided on both sides thereof in the width direction of the light source substrate 42. Therefore, the length of the light source substrate 42 in the width direction can be reduced, to thereby cut down a material cost of the light source substrate 42. In the light source substrate 42 illustrated in FIG. 4, a fixing portion 51 for fixing the fixture 50 therethrough is illustrated at each position corresponding to the fixture 50 illustrated in FIG. 3. In this embodiment, the fixing portion 51 is a hole through which a screw portion of the fixture 50 as a screw passes.

The backlight unit 4 further includes a reflection sheet 43. The reflection sheet 43 has, in plan view, a rectangular shape of a size set accordingly to that of the liquid crystal panel 2. Further, the reflection sheet 43 in this example is curved or folded so that the center in the vertical direction thereof protrudes toward the rear side. The reflection sheet 43 is also housed in the casing 49.

The LED modules 46 are positioned on the front surface (reflective surface) side of the reflection sheet 43. Therefore, the light emitted from the LED modules 46 toward the liquid crystal panel 2 includes not only the light emitted from the LED modules 46 directly toward the liquid crystal panel 2, but the light reflected on the front surface of the reflection sheet 43.

As illustrated in FIG. 2, the reflection sheet 43 has inclined surfaces 43a on upper and lower sides of the light source substrate 42 onto which the LED modules 46 are disposed. The inclined surfaces 43a are extended upwardly and downwardly from the light source substrate 42 and are inclined forward.

The light source substrate 42 is positioned on the rear surface of the reflection sheet 43. The reflection sheet 43 is formed so as to avoid the positions of the LED modules 46. In this embodiment, the reflection sheet 43 has a plurality of holes formed therein. The reflection sheet 43 is overlapped on the front surface of the light source substrate 42, and each of the LED modules 46 is positioned on the inner side of the hole formed in the reflection sheet 43.

Further, as illustrated in FIG. 2, the backlight unit 4 includes a plurality of optical sheets 47. The optical sheets 47 are positioned between the LED modules 46 and the liquid crystal panel 2. The optical sheets 47 include a diffusion sheet for diffusing the light emitted from the LED modules 46 and a prism sheet.

Figure 5:
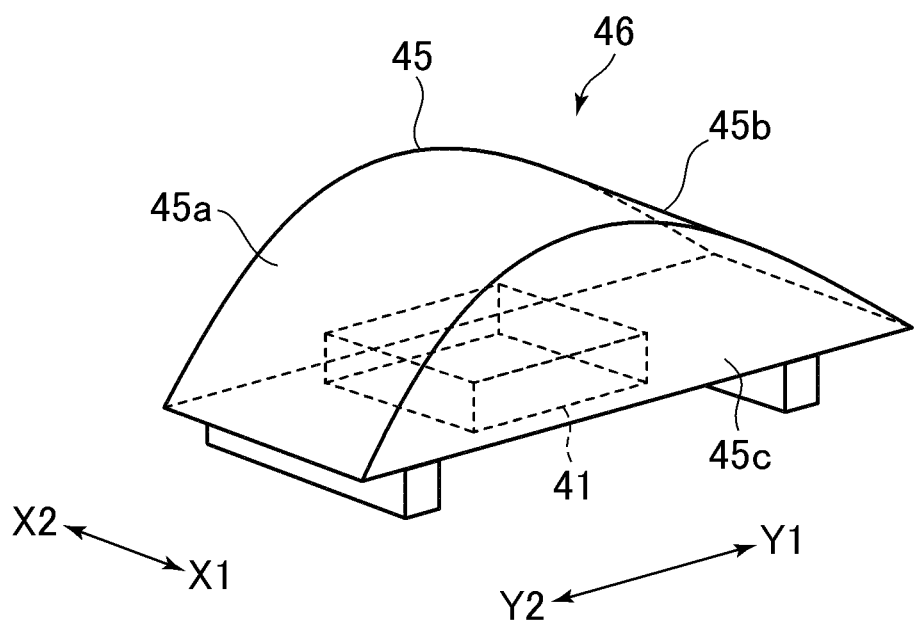
FIG. 5 is a perspective view of an LED module of the liquid crystal display device according to the first embodiment.
Figure 6:
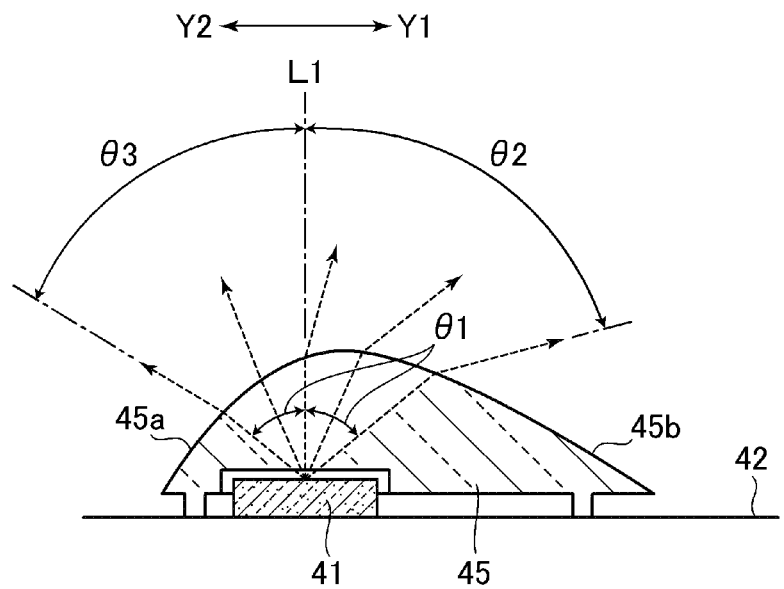
FIG. 6 is a cross-sectional view of the LED module taken along the line VI-VI of FIG. 4.
Figure 7:
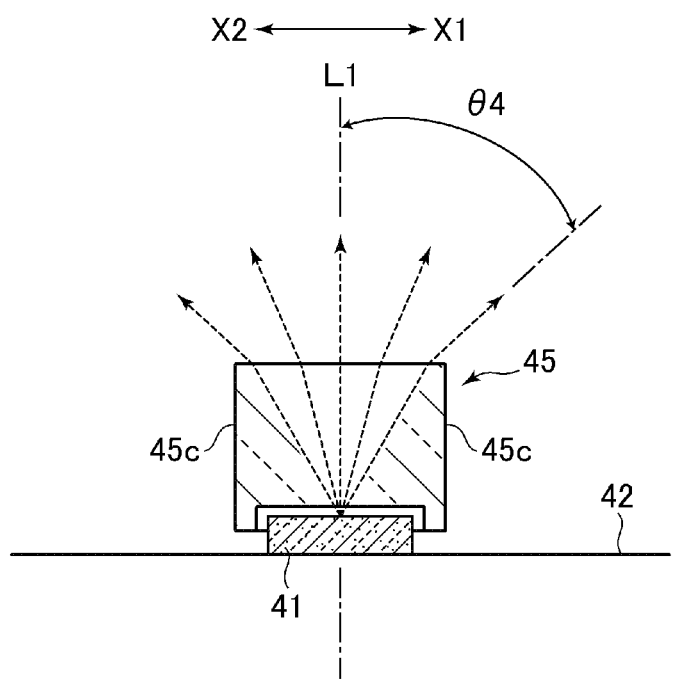
FIG. 7 is a cross-sectional view of the LED module taken along the line VII-VII of FIG. 4.

As described above, the LED module 46 includes the LED element 41 and the lens 45. FIG. 5 is a perspective view of the LED module 46 of the liquid crystal display device 1. FIG. 6 is a cross-sectional view of the LED module 46 taken along the line VI-VI illustrated in FIG. 4. FIG. 7 is a cross-sectional view of the LED module 46 taken along the line VII-VII illustrated in FIG. 4.

The lens 45 is disposed over the LED element 41, and the light emitted from the LED element 41 enters the lens 45. The light emitted from the LED element 41 is transmitted through the lens 45, and exits toward the rear surface of the liquid crystal panel 2. In this example, the lens 45 is disposed over each of the LED modules 41. The lens 45 is larger than the LED element 41 in plan view, and is disposed so as to cover the LED element 41.

The divergence angle (exit angle range, for example, $\theta 1$ in FIG. 6) of light emitted from the LED element 41 is expanded by the lens 45. The divergence angle is an angle representing the expanse of light emitted from each of the LED modules 41. The divergence angle is an angle with respect to an optical axis of the LED element 41 (straight line L1 in FIGS. 6 and 7, corresponding to a straight line which passes through the center of the LED element 41 and is perpendicular to the light source substrate 42).

As illustrated in FIG. 3, when the liquid crystal panel 2 is sectioned into a plurality of partial regions E each corresponding to an LED module 46, each partial region E represents a region toward which light emitted from each LED module 46 is desirably directed. Note that, the correspondence relationship between each LED module 46 and each partial region E may not be so strict. One LED module 46 may be associated with one partial region E, and alternatively a plurality of LED modules 46 may be associated with one partial region E. Actually, it is preferred to design such that light emitted from one LED module 46 overlaps light emitted from another LED module 46 in a region in the vicinity of the boundary of respective partial regions E so that the entire surface of the liquid crystal panel 2 receives light irradiation at uniform intensity.

The partial region E is a region extended in the width direction of the light source substrate 42. In this embodiment, as illustrated in FIG. 3, the partial region E is a rectangular region elongated in the vertical direction of FIG. 3. As described above, the plurality of LED modules 46 are arranged in the length direction of the light source substrate 42. The plurality of partial regions E are also arranged in the length direction of the light source substrate 42 in conformity to the arrangement of the LED modules 46. Note that, the shape of the partial region E is not limited to the shape illustrated in FIG. 3. For example, the width of the partial region E may gradually increase as the distance from the light source substrate 42 increases. Further, the partial region E may be defined so as to have a portion overlapping with the adjacent partial region E.

The lens 45 expands the light emitted from the LED element 41 mainly toward the partial region E assigned to the LED module 46 including the LED element 41. That is, as illustrated in FIGS. 6 and 7, the lens 45 expands the light so that the divergence angle of the light emitted from the LED element 41 is not equally expanded in all radial directions with its optical axis L1 as a center, but is expanded so as to be deflected in a direction toward the partial region E. In the example described here, the partial region E is a region elongated in the vertical direction. Therefore, the lens 45 expands the divergence angle of the light mainly in the vertical direction, and refracts the light toward the upper side and the lower side of the light source substrate 42. As a result, the divergence angle of the light in the vertical direction ($\theta 2$ and $\theta 3$ in FIG. 6) is larger than the divergence angle expanded in any other directions (for example, the divergence angle in the lateral direction ($\theta 4$ in FIG. 7)).

Part of the light which exits from the lens 45 upwardly and downwardly is reflected by the inclined surfaces 43a of the reflection sheet 43. Thus, the light is applied to the regions of the liquid crystal panel 2, at which no LED modules 46 are provided face to face (for example, end portions of the partial region E).

As illustrated in FIG. 5, a light exiting surface of the lens 45 is a curved surface formed into a convex shape. The light exiting surface has a steep slope 45a and a gentle slope 45b which are extended upwardly and downwardly from a top portion of the lens 45 and gradually approaches the light source substrate 42. In other words, the lens 45 is asymmetric in the width direction of the light source substrate 42 about the optical axis L1 of the LED element 41 as illustrated in FIG. 6. With the asymmetric shape, the divergence angle $\theta 2$ for light beams expanded by the gentle slope 45b is larger than the divergence angle $\theta 3$ for light beams expanded by the steep slope 45a. The reason is that, because the LED module 46 illustrated in FIG. 6 is disposed so as to be offset to the lower side of the light source substrate 42 (that is, the Y2 side) as illustrated in FIG. 4, it is necessary to expand light beams more toward the upper side of the light source substrate 42 (that is, the Y1 side) in order to irradiate the entire partial region E illustrated in FIG. 3 with light beams uniformly. It should be understood that an LED module 46 adjacent to the LED module 46 illustrated in FIG. 6 is disposed so as to be offset to the upper side of the light source substrate 42 (that is, the Y1 side) as illustrated in FIG. 4 and hence the lens 45 of the adjacent LED module 46 has a shape opposite to the shape illustrated in FIG. 6 so as to expand light beams more toward the lower side of the light source substrate 42 (that is, the Y2 side). Note that, the light exiting surface of the lens 45 is a surface that can be formed by parallel translation of a straight line parallel to the lateral direction. Further, it is not essential to form such asymmetric light exiting surface of the lens 45, and the light exiting surface may have a symmetric shape about the optical axis L1 in the case where the use of the symmetric shape about the optical axis L1 is sufficient to irradiate the liquid crystal panel 2 with light beams uniform at a practical level.

Further, as illustrated in FIG. 7, the lens 45 has a pair of side surfaces 45c facing opposite each other (see FIG. 7). The side surfaces 45c extend downward from the right and left edges of the light exiting surface toward the light source substrate 42. In this example, the side surfaces 45c are flat surfaces formed perpendicularly to the light source substrate 42, and are substantially parallel to the optical axis L1 of the LED element 41. Therefore, the expanse of the divergence angle in the length direction of the light source substrate 42 is suppressed. Further, the lens 45 has, in plan view, a substantially rectangular shape elongated in the vertical direction. Note that, the shape of the lens 45 is not limited thereto. For example, the lens 45 may be formed into an elliptical shape elongated in the vertical direction.

Note that, the present invention is not limited to the first embodiment described above, and various modifications can be made thereto.

Figure 8:
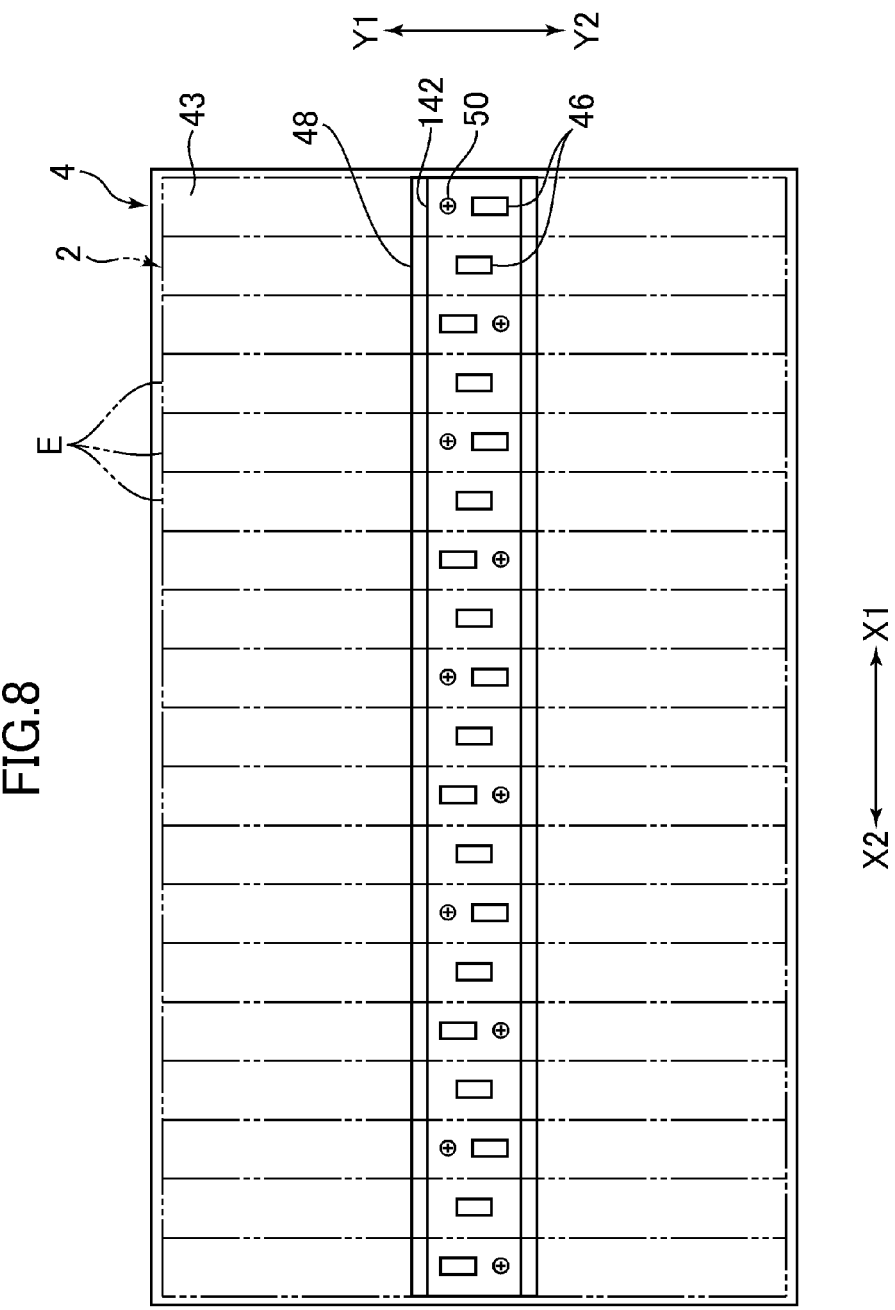
FIG. 8 is a front view of a backlight unit of a liquid crystal display device according to a second embodiment of the present invention.

Subsequently, a second embodiment of the present invention is described. FIG. 8 is a front view of a backlight unit 4 of a liquid crystal display device 1 according to the second embodiment of the present invention. The liquid crystal display device 1 according to this embodiment is the same as the liquid crystal display device 1 according to the first embodiment, except for the arrangement of LED modules 46 and fixtures 50 on a light source substrate 142. Accordingly, common portions are denoted by the same reference symbols, and detailed description thereof is omitted. Further, the following description refers to FIGS. 1 and 2 as the figures illustrating the liquid crystal display device 1 of this embodiment.

As illustrated in FIG. 8, in this embodiment, the LED modules 46 are arranged in the longitudinal direction of the light source substrate 142 in a manner that an LED module that is offset in the upward direction (Y1 direction) of the figure with respect to a width direction of the light source substrate 142, an LED module that is disposed substantially at the center in the width direction of the light source substrate 142, an LED module that is offset in the downward direction (Y2 direction) of FIG. 8, and an LED module that is disposed substantially at the center in the width direction of the light source substrate 142 again are arranged in the stated order. That is, the LED modules 46 are arranged in three rows in a longitudinal direction of the light source substrate 142 so as to be disposed in a wavelike fashion in the width direction of the light source substrate 142. Then, the fixtures 50 are each disposed on the side of the LED module 46, which is offset to any one position in the width direction of the light source substrate 142, in an opposite direction to the offset direction.

This arrangement makes brightness unevenness less conspicuous in portions of the partial region E further from the light source substrate 142, specifically in portions in the vicinity of the vertical ends of the partial region E in FIG. 8. That is, in the liquid crystal display device 1 according to the first embodiment described above, as illustrated in FIG. 3, the LED modules 46 are disposed so as to be offset alternately in the width direction of the light source substrate 42. In this case, there is no problem if the shape of the lens 45 used in the LED module 46 allows the entire region of each partial region E to be irradiated with light beams uniformly. However, in the case where the entire region of each partial region E cannot be irradiated with light beams uniformly because of usage of the lens 45 with a shape having a light exiting surface symmetric about the optical axis L1 or design constraints, bright portions and dark portions appear alternately in the portions in the vicinity of the vertical ends of the partial regions E, and the brightness difference increases between adjacent partial regions E and is visually recognized as unevenness in some cases. In this case, the arrangement of this embodiment, in which the LED module 46 that is disposed at the center of the light source substrate 142 is disposed between the LED modules 46 that are offset in the width direction of the light source substrate 142, can reduce the brightness difference between adjacent partial regions E, to thereby make unevenness less visually recognizable.

Figure 9:
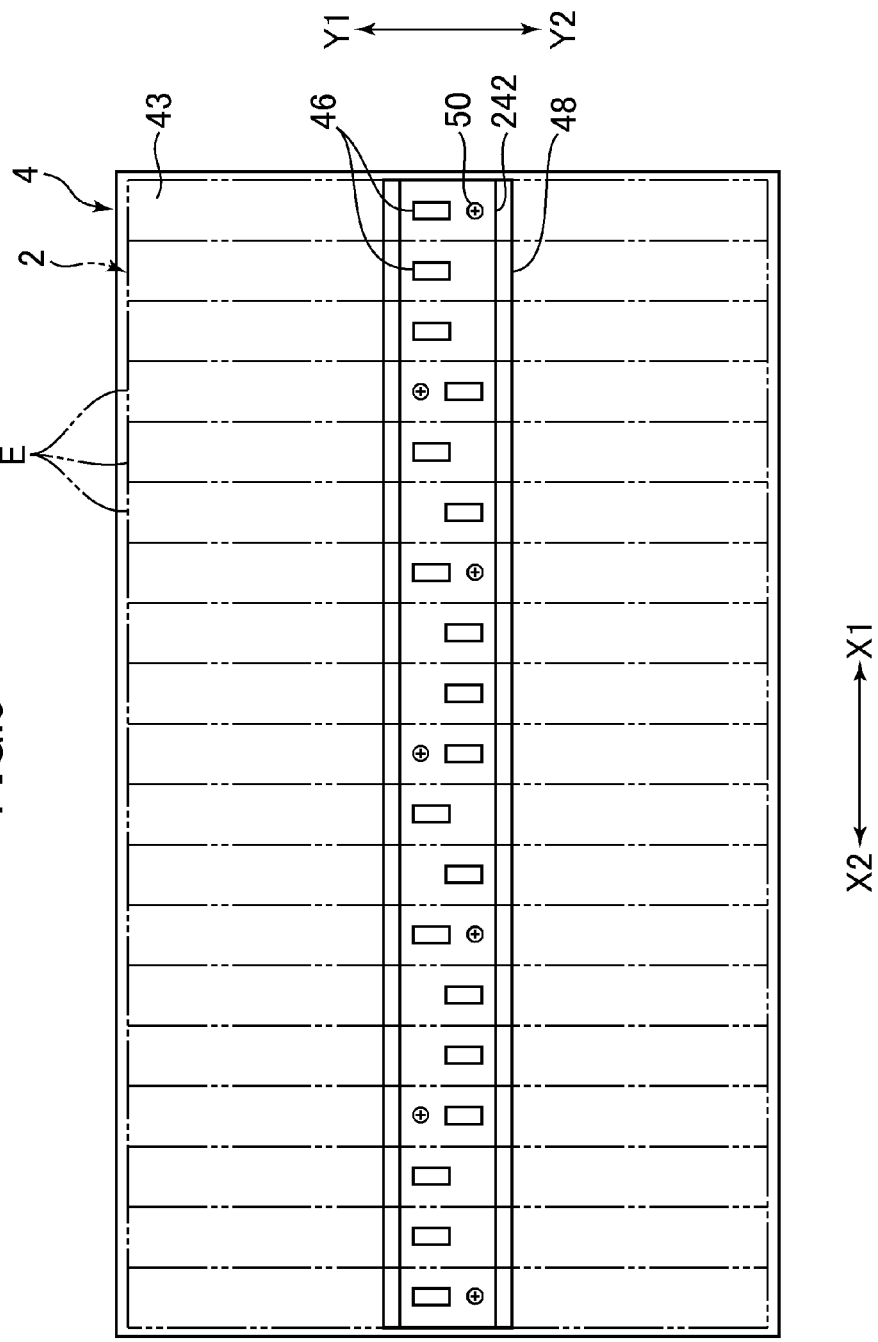
FIG. 9 is a front view of a backlight unit of a liquid crystal display device according to a third embodiment of the present invention.

Subsequently, a third embodiment of the present invention is described. FIG. 9 is a front view of a backlight unit 4 of a liquid crystal display device 1 according to a third embodiment of the present invention. The liquid crystal display device 1 according to this embodiment is also the same as the liquid crystal display device 1 according to the first embodiment, except for the arrangement of LED modules 46 and fixtures 50 on a light source substrate 242. Accordingly, common portions are denoted by the same reference symbols, and detailed description thereof is omitted. Further, the following description refers to FIGS. 1 and 2 as the figures illustrating the liquid crystal display device 1 of this embodiment.

As illustrated in FIG. 9, in this embodiment, the LED modules 46 are arranged in a longitudinal direction of the light source substrate 242 in a manner that LED modules 46 that are offset in the upward direction of FIG. 9 (Y1 direction) and LED modules 46 that are offset in the downward direction of FIG. 9 (Y2 direction) with respect to a width direction of the light source substrate 242 are arranged irregularly. That is, the LED modules 46 are arranged in the longitudinal direction of the light source substrate 242 so as to be offset in the width direction of the light source substrate 242 irregularly. Further, also in this embodiment, the fixtures 50 are each disposed on the side of the LED module 46, which is offset to any one position in the width direction of the light source substrate 242, in an opposite direction to the offset direction.

This arrangement also makes brightness unevenness less conspicuous in portions of the partial region E further from the light source substrate 242, specifically in portions in the vicinity of the vertical ends of the partial region E in FIG. 9. This is because human eyes easily recognize a regular brightness difference as unevenness while less recognizing an irregular brightness difference as unevenness. Therefore, this embodiment is also effective to the case where the entire region of each partial region E cannot be irradiated with light beams uniformly because of usage of the lens 45 with a shape having a light exiting surface symmetric about the optical axis L1 or design constraints.

Figure 10:
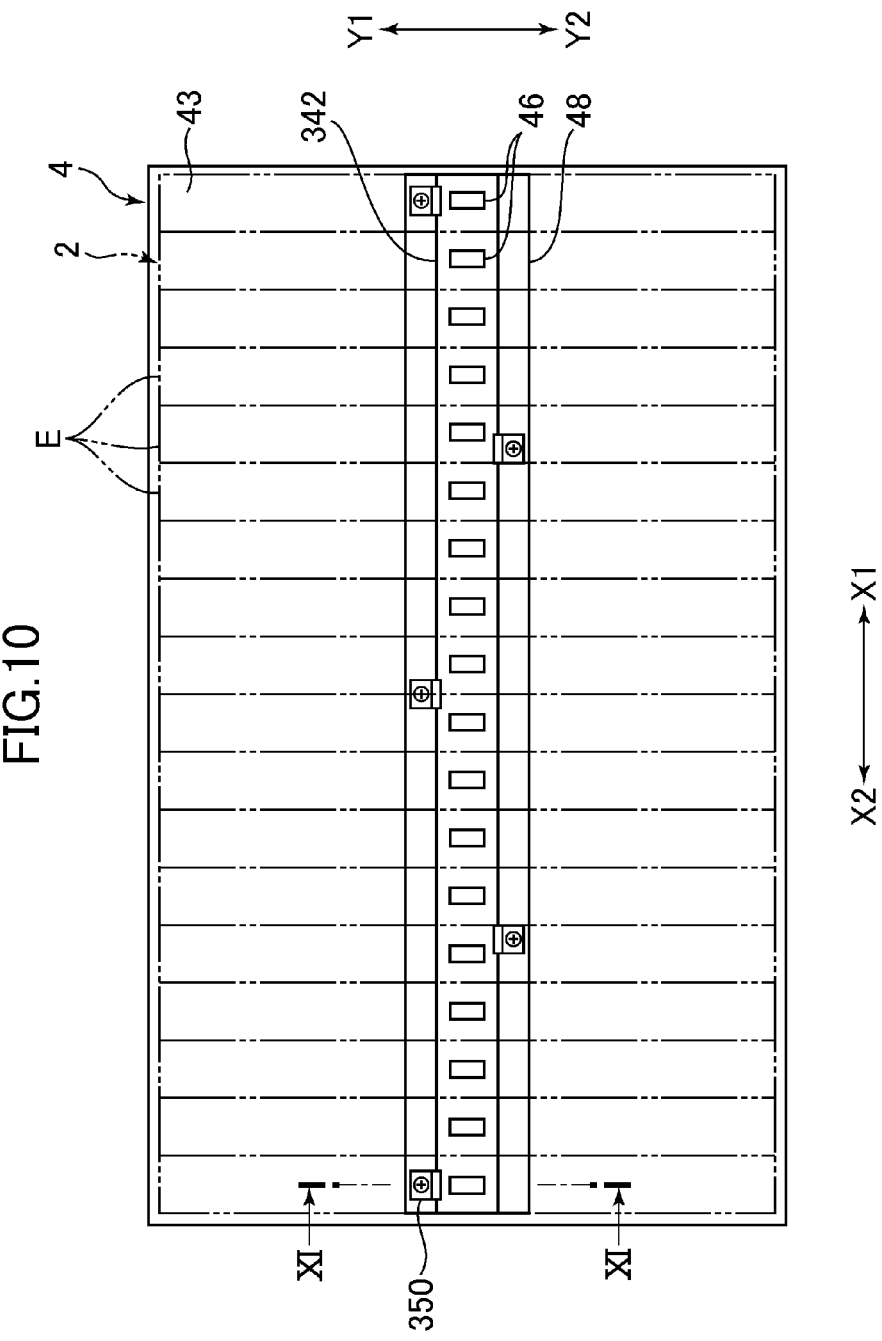
FIG. 10 is a front view of a backlight unit of a liquid crystal display device according to a fourth embodiment of the present invention.

Subsequently, a fourth embodiment of the present invention is described. FIG. 10 is a front view of a backlight unit 4 of a liquid crystal display device 1 according to the fourth embodiment of the present invention. The liquid crystal display device 1 according to this embodiment is different from the liquid crystal display device 1 according to the first embodiment in that the LED modules 46 are arranged in line and that fixtures 350 for fixing a light source substrate 342 and the fixing plate 48 to each other are disposed outside the light source substrate 342 in plan view. Other structures and components are the same as those of the liquid crystal display device 1 according to the first embodiment. Accordingly, common portions are denoted by the same reference symbols, and detailed description is omitted. Further, the following description refers to FIG. 1 as the drawing illustrating the liquid crystal display device 1 of this embodiment.

As illustrated in FIG. 10, in this embodiment, the LED modules 46 are disposed on the light source substrate 342 in line. Then, the fixing portion 51 (see FIG. 4 in the first embodiment) such as a screw hole is not provided in the light source substrate 342. The length of the light source substrate 342 in the width direction is slightly longer than that of the LED modules 46. End portions of the light source substrate 342 protrude to both sides of the LED modules 46 in the width direction by a minimum necessary length. Utilizing the protruded end portions of the light source substrate 342, the fixtures 350 fix the light source substrate 342 onto the fixing plate 48.

Figure 11:
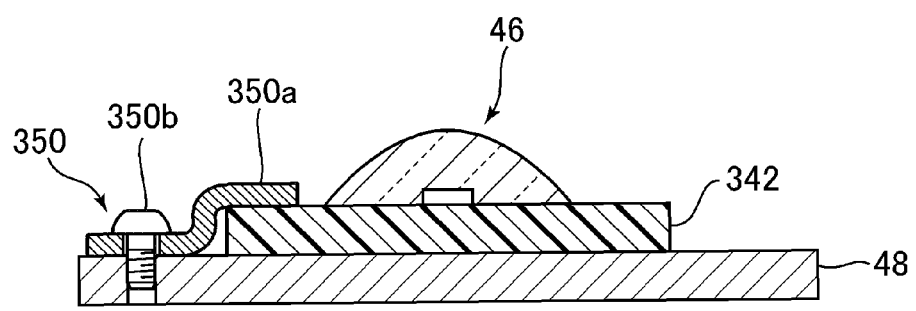
FIG. 11 is a cross-sectional view taken along the line XI-XI of FIG. 10.

FIG. 11 is a cross-sectional view taken along the line XI-XI illustrated in FIG. 10. As illustrated in FIG. 11, in the example of this embodiment, the fixture 350 includes a bracket 350a and a screw 350b. The bracket 350a has a stepped shape and is configured to fix the light source substrate 342 onto the fixing plate 48 by being fixed onto the fixing plate 48 by the screw 350b and pressing the light source substrate 342 thereon. With this configuration, the light source substrate 342 and the fixing plate 48 can be fixed to each other simply by providing the light source substrate 342 with a region for disposing the LED modules 46 and slight regions on both sides of the region in the width direction. Therefore, the area of the light source substrate 342 can be reduced, to thereby cut down a material cost thereof.

Figure 12:
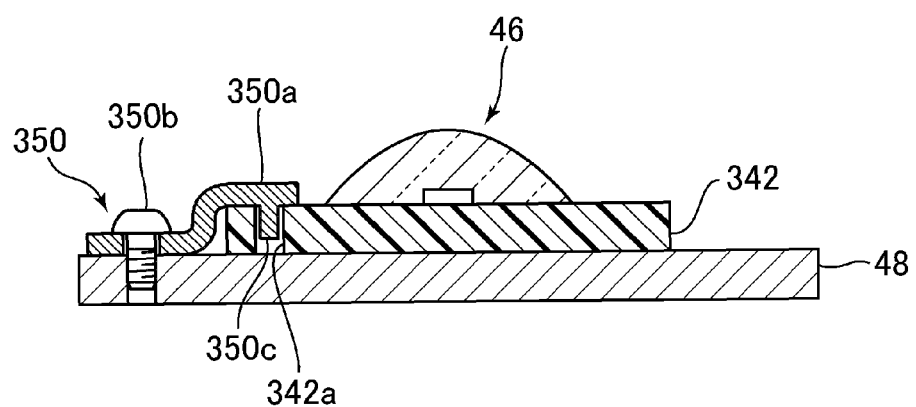
FIG. 12 is a view illustrating a modified example of the liquid crystal display device according to the fourth embodiment of the present invention.

FIG. 12 is a view illustrating a modified example of the liquid crystal display device 1 of this embodiment. FIG. 12 corresponds to FIG. 11 and illustrates a cross section taken along the line XI-XI of FIG. 10 similarly to FIG. 11. In this modified example, a light source substrate 342 has a hole 342a provided therein, and the light source substrate 342 is fixed reliably in a positioned state when a protrusion 350c provided in a bracket 350a is fit into the hole 342a. Note that, the shape of the hole 342a is not particularly limited, and may be a round hole or a square hole and may be a groove. Further, the hole 342a may be a through hole or a so-called blind hole. Similarly, the shape of the protrusion 350c is not particularly limited, and may be columnar, prism-like, or plate-like. Further, the protrusion 350c may be a tapered shape in which the outer shape of the protrusion 350c becomes smaller toward the distal end thereof, so as to have an automatic self-aligning function.

By incorporating the liquid crystal display device described in any one of the embodiments described above, a television set can be formed, which receives radio waves for television broadcast to display images and output sound. Hereinafter, a liquid crystal television set is described as an example.

Figure 13:
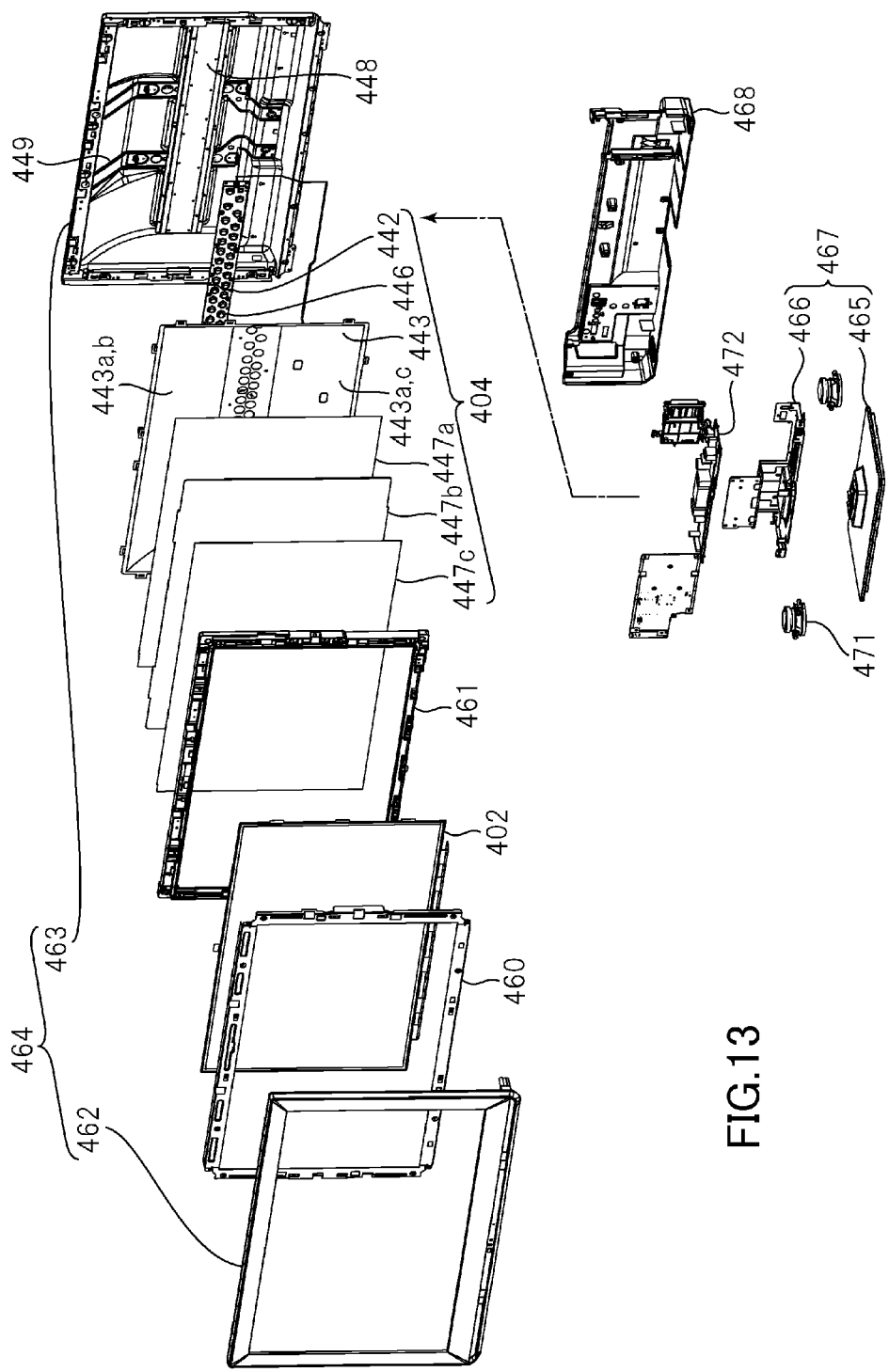
FIG. 13 is an exploded perspective view of a liquid crystal television set according to a fifth embodiment of the present invention.
Figure 14:
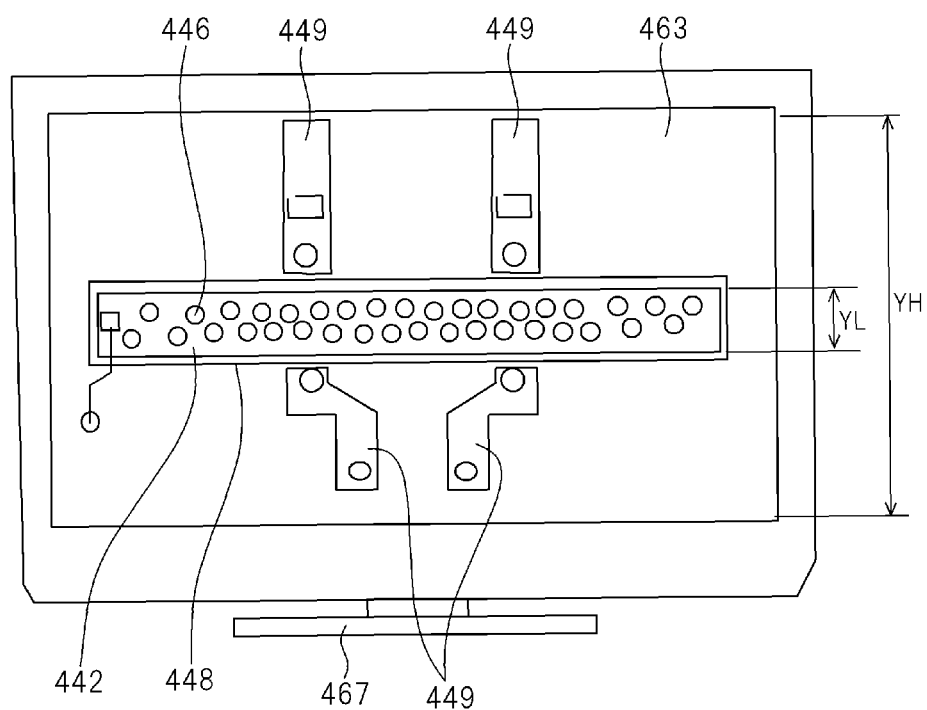
FIG. 14 is a view illustrating members provided behind a reflection sheet of the liquid crystal television set illustrated in FIG. 13.
Figure 15:
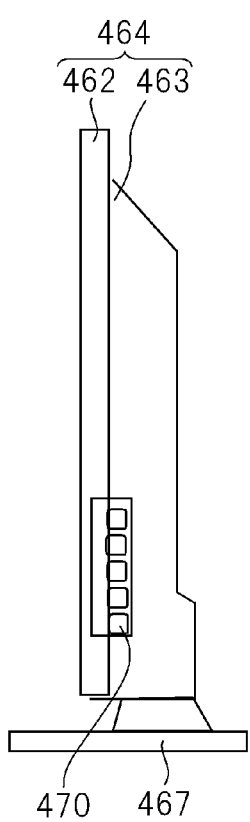
FIG. 15 is a side view of the liquid crystal television set illustrated in FIG. 13.
Figure 16:
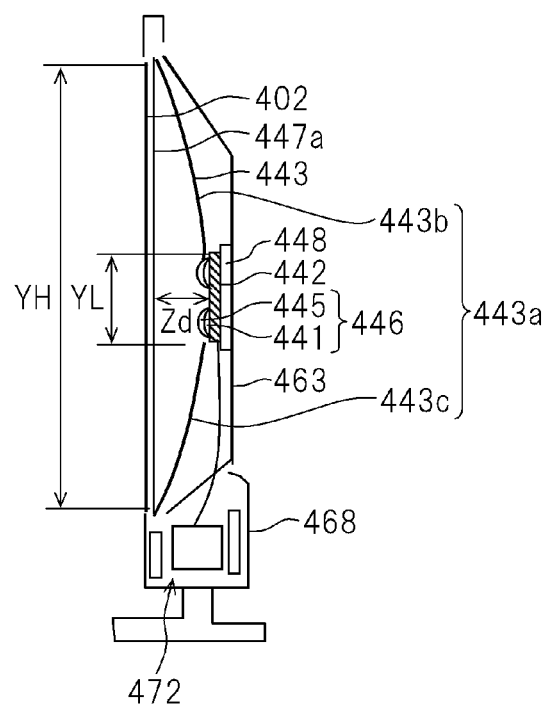
FIG. 16 is a schematic view of a vertical cross section of the liquid crystal television set illustrated in FIG. 13.

FIG. 13 is an exploded perspective view of a liquid crystal television set according to a fifth embodiment of the present invention. FIG. 14 is a view illustrating members provided behind a reflection sheet of the liquid crystal television set illustrated in FIG. 13. FIG. 15 is a side view of the liquid crystal television set illustrated in FIG. 13. FIG. 16 is a schematic view of a vertical cross section of the liquid crystal television set illustrated in FIG. 13.

The liquid crystal television set includes a liquid crystal display panel 402 having a horizontally long screen. The screen of the liquid crystal television set has an aspect ratio (ratio of horizontal dimension to vertical dimension) of 16:9. The liquid crystal display panel 402 has a front side (side on which an image is displayed) supported by an upper frame 460, and a rear side supported by a mold frame 461. The liquid crystal television set includes a backlight unit 404, which is overlapped by the liquid crystal display panel 402.

The liquid crystal display panel 402, the upper frame 460, the mold frame 461, and the backlight unit 404 are stored in a cabinet 464 including a front cabinet 462 and a back cabinet 463. The front cabinet 462 is made of a resin, and the back cabinet 463 is made of a coated metal. The cabinet 464 is supported by a stand 467 including a pedestal 465 and a leg 466. As illustrated in FIG. 15, on the side surface of the cabinet 464, switches 470 are provided.

A cover 468 is attached to a lower rear part of the back cabinet 463. A speaker 471 and a circuit board 472 are disposed inside the cover 468. The circuit board 472 includes a tuned circuit (tuner) for selecting a radio wave having a specific frequency from radio waves having various frequencies.

The backlight unit 404 includes a reflection sheet 443 having an inclined surface 443a so that a recess surface thereof faces the liquid crystal display panel 402. The inclined surface 443a, which is a curved portion of the reflection sheet 443, is disposed so as to be separated from the cabinet 464 (see FIG. 16). The inclined surface 443a includes a first curved portion 443b and a second curved portion 443c. The first curved portion 443b and the second curved portion 443c are formed on both sides of a plurality of LED modules 446 in a vertical direction of the screen, respectively. The circuit board 472 is disposed on a lower side of a space between the inclined surface 443a and the back cabinet 463 (see FIG. 16).

The backlight unit 404 includes a light source substrate 442, which is disposed on the side of the reflection sheet 443 opposite to the liquid crystal display panel 402 and on which the reflection sheet 443 is overlapped. A width of the light source substrate 442 in the vertical direction of the screen is half the length of the screen in the vertical direction or less. The light source substrate 442 is fixed to the cabinet 464. The light source substrate 442 may be directly fixed to the cabinet 464, or may be fixed to the cabinet 464 through intermediation of a fixing plate 448. An example of the latter case is a structure in which the light source substrate 442 is fixed to the fixing plate 448, and the fixing plate 448 is fixed to the cabinet 464.

In this embodiment, at a position roughly corresponding to a center of the screen, the LED modules 446 including LED elements 441 (see FIG. 16) are mounted on the rectangular light source substrate 442, which is long in the horizontal direction. A printed-wiring board can be used as the light source substrate 442. Fixation of the light source substrate 442 is performed by threadably fixing the light source substrate 442 to the back cabinet 463, or threadably fixing the light source substrate 442 to the fixing plate 448, which is a radiator plate made of a metal such as aluminum, and then fixing the fixing plate 448 to the back cabinet 463. The LED modules 446 are disposed in a staggered pattern and in two rows in the up-and-down direction, so as to extend in the horizontal direction. When seen from the front side, a dimension YL of the light source substrate 442 is set so as to be one-third a height YH of the screen of the liquid crystal display panel 402 or less.

The backlight unit 404 includes the plurality of LED modules 446, which are mounted on the light source substrate 442 and disposed so as to protrude to the recess surface side of the inclined surface 443a while passing through the reflection sheet 443. The plurality of LED modules 446 are arranged in at least one row in the horizontal direction of the screen, and arranged so as to be stored within a space region, the width of which in the vertical direction of the screen is half the length of the screen in the vertical direction or less. Each of the LED modules 446 includes, as illustrated in FIG. 16, the LED element 441 and a lens 445 disposed on the outer side thereof. On the light source substrate 442, the lenses 445 each made using an acrylic resin are mounted so as to respectively cover the LED elements 441.

Figure 17:
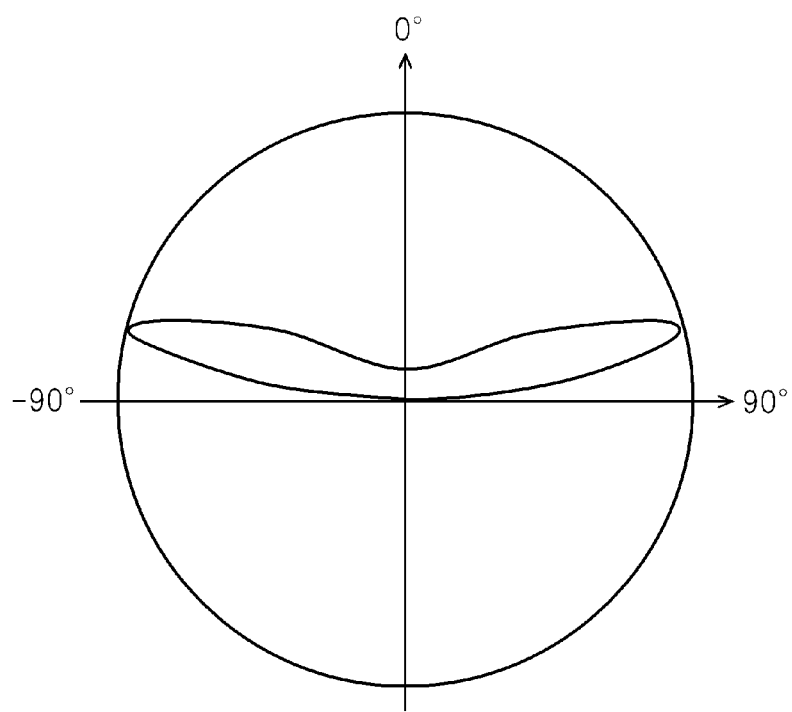
FIG. 17 is a graph illustrating a light intensity distribution (directivity characteristic) of an LED module.
Figure 18:
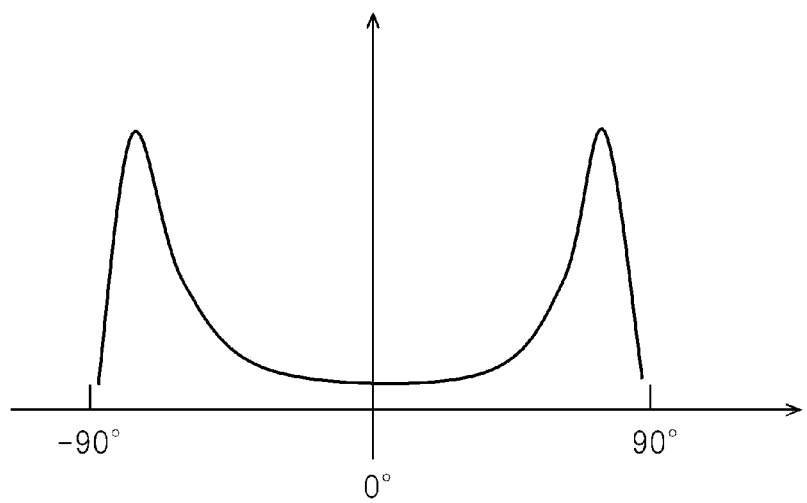
FIG. 18 is a graph illustrating a measurement result of intensity of light which exits from a lens.

The LED module 446 emits light in a perpendicular direction to the light source substrate 442 and in other directions, and light emitted in the other directions is higher in intensity than light emitted in the perpendicular direction. The lens 445 has a wide light distribution characteristic, which causes the light emitted from the LED element 441 to be more spread out in a viewing angle direction than in a front side direction. Such a light intensity distribution (directivity characteristic) of the LED module 446 is illustrated in FIG. 17. Further, FIG. 18 is a graph illustrating a measurement result of intensity of light which exits from the lens 445. Note that, θ represents an angle formed between the normal to the light source substrate 442 and a light emission direction.

One of the features of the liquid crystal television set is high image quality performance, which provides an impression that, although the vertical direction dimension YL of the light source substrate 442 is reduced to be one-third the screen dimension YH or less along the vertical direction of the screen, the screen is bright and high brightness uniformity is provided across the entire screen.

In the conventional liquid crystal television set, a plurality of substrates each including a plurality of light emitting diodes are provided so as to obtain uniform brightness or smooth brightness change even in a region between the substrates. Specifically, many light emitting diodes are used to shorten intervals between the light emitting diodes to obtain smooth brightness change, and the substrates are disposed so that each position of the individual light emitting diodes cannot be optically recognized. Further, there is a case where wide intervals are provided between the plurality of substrates by disposing lenses for wide light distribution above the light emitting diodes, but even in this case, the dimension of the substrates is larger than one-third the screen.

In this embodiment, a dimension between outer surfaces of a pair of lenses 445 which are most separated in the vertical direction, the outer surfaces facing directions opposite to each other, is one-third the screen dimension YH or less. When the LED elements 441 are disposed in a row in the horizontal direction, a width (diameter) of the lens 445 in the vertical direction is one-third the screen dimension YH or less. In order to reduce cost, the LED element 441 and the lens 445 are formed in dimensions not to extend off the light source substrate 442, and the dimensions thereof are set to the minimum.

In this embodiment, the vertical dimension YL of the light source substrate 442, or the dimension between outer sides of the lenses 445 arranged in two rows in the vertical direction, is one-third the vertical dimension of the screen or less. Therefore, even if the number of the LED elements 441 is reduced, the screen is bright and a natural and smooth brightness distribution is obtained. Therefore, the cost may be greatly reduced.

In this embodiment, the inclined surface 443a of the reflection sheet 443 is formed so as to have a width of a length obtained by subtracting the vertical dimension YL of the light source substrate 442 from the dimension YH in the vertical direction of the screen (short side direction of the screen). When the width of the inclined surface 443a is half the dimension YH or more, the brightness distribution of the screen is comfortable even when the screen is seen from the front side. Further, the number of LED elements 441 can be significantly reduced, and hence the cost can be reduced. That is, the cost can be reduced by forming a region for reflection by the inclined surface 443a to be larger than a region for a space where the LED modules 446 are stored.

The light emitted from the LED element 441 disposed on the light source substrate 442 is spread out by the lens 445, which is made of an acrylic resin and disposed above the LED element 441. The light thus spread out has a distribution characteristic that light intensity is larger in an oblique direction than in the front side direction. The lens 445 for wide light distribution is attached to each of the plurality of LED elements 441, and hence, in a space in a range from the light source substrate 442 to a diffusion plate 447a provided in the perpendicular direction (direction to the screen) (hereinafter, the range is referred to as inner thickness Zd), the light radiated to a peripheral direction of the screen from the light source substrate 442 has higher light intensity than that of the light emitted to the front side. Part of the light which exits from the lens 445 to the front side passes through the diffusion plate 447a, and then is used to display an image by the liquid crystal display panel 402. Further, the remaining light is reflected by the diffusion plate 447a, and then reflected by the reflection sheet 443, to thereby be radiated to a direction different from the front side direction. Part of the light radiated toward the periphery of the screen via the lens 445 passes through the peripheral portion of the screen via the diffusion plate 447a. Other part of the light is reflected by the reflection sheet 443 having the inclined surface 443a, and passes through the diffusion plate 447a again.

As for the brightness performance of the liquid crystal television set having the above-mentioned structure, when the brightness measured from the front side is 100%, the periphery thereof is in a dark state of about 30%. A ratio of the brightness at the center of the screen in the front side to the average brightness is 1.65. However, because the inclined surface 443a of the reflection sheet 443 is smoothly curved, a smooth brightness change is obtained from the light source substrate 442 in the vertical direction of the screen. Therefore, even though the ratio of the central brightness to the average brightness is as large as 1.65, it is possible to provide a comfortable image because a large inflection point is absent in the distribution thereof.

The fact that a comfortable and smooth brightness distribution can be obtained even though the ratio of the central brightness to the average brightness is 1.65 or larger represents that, conversely, it is possible to reduce the number of the LED elements 441 and narrow the width of the light source substrate 442, to thereby reduce the cost.

Note that, it is impossible to achieve the characteristic that the brightness at the center is high and the brightness decreases with smooth brightness distribution toward the periphery of the screen when a structure which blocks light radiation to the front side is provided. In this case, the center is dark, which results in uncomfortable display distribution. Therefore, the light emission characteristic of each LED module 446, which includes the LED element 441 and the lens 445 near the corresponding LED element 441, provides a predetermined output to the front side.

The back cabinet 463 forms the outermost surface of the liquid crystal television set. The light source substrate 442 is threadably fixed to the fixing plate 448. By dissipating the heat from the LED elements 441 by the light source substrate 442 and the fixing plate 448, the junction temperature of the LED element 441 is suppressed to a predetermined value. In a case where the specification brightness of the liquid crystal television set is low, the fixing plate 448 may be omitted. In this case, the light source substrate 442 is directly fixed to the back cabinet 463. In this case, heat dissipation of the LED element 441 is performed only by the light source substrate 442, but even with the heat dissipation effect of the light source substrate 442, the junction temperature of the LED element 441 can be suppressed to a predetermined value.

The light source substrate 442 and the reflection sheet 443 are fixed at positions near the back cabinet 463, and hence it is possible to achieve a thin liquid crystal television set. With this structure, the thickness of the liquid crystal television set can be reduced while maintaining the comfortable uniformity of the brightness performance.

In the conventional backlight structure, the substrate on which the light emitting diodes are mounted is fixed to a back frame (not shown) of the liquid crystal display device, which is made of iron or aluminum. On the outer portion of the back frame, there are disposed a power supply for driving the light emitting diodes and a substrate of a timing controller for controlling a gate signal line and a drain signal line of the liquid crystal display panel. The back cabinet is disposed on a further outer portion thereof. Therefore, the television set requires, in addition to the inner thickness distance between the diffusion plate and the light emitting diode of the backlight, a distance between the back frame and the back cabinet, which causes the liquid crystal television set to be thick.

In this embodiment, light, which exits from the lens 445 with a higher brightness in the periphery than in the front side, passes through the predetermined space (inner thickness Zd), and then passes through the diffusion plate 447a and the liquid crystal display panel 402. With this, an image is displayed. The light source substrate 442 is brought into contact with the fixing plate 448, and the fixing plate 448 and the back cabinet 463 are fixed to each other by a screw, and hence a space distance other than the inner thickness Zd is unnecessary. Therefore, the liquid crystal television set is thinned.

The thinning of the liquid crystal television set is achieved also by the disposition of the circuit board 472 including a power supply circuit, a video circuit, a tuned circuit (tuner), and a timing circuit for the liquid crystal display panel 402. Specifically, the inclined surface 443a of the reflection sheet 443 is curved in a direction separating from the back cabinet 463, and hence a large space can be obtained between the inclined surface 443a and the back cabinet 463. In the lower portion of the liquid crystal television set, the circuit board 472 including the power supply circuit, the video circuit, the tuned circuit (tuner), and the timing circuit for the liquid crystal display panel 402 is stored in a compact manner. With this, a space is unnecessary between the back cabinet 463 and the light source substrate 442 on which the LED elements 441 are mounted or between the back cabinet 463 and the fixing plate 448.

Next, manufacturing steps of the liquid crystal television set are described with reference to FIG. 13. For example, a wall-mount bracket 449 is attached to the back cabinet 463 from the inner side thereof, the back cabinet 463 being formed by subjecting a member made of an iron material to coating. The wall-mount bracket 449 reinforces the strength of the back cabinet 463. Screw receiving holes are formed in the wall-mount bracket 449, which are used when the liquid crystal television set is mounted on the wall from the rear side of the back cabinet 463. The fixing plate 448 is fixed to the inner side of the back cabinet 463, the fixing plate being made of an aluminum material.

Next, the light source substrate 442 on which the LED elements 441 are mounted is fixed to the fixing plate 448. On each of the LED elements 441, the acrylic lens 445 for wide light distribution is capped, and the lens 445 is fixed by an adhesive. Depending on the brightness specification of the liquid crystal television set, when there is a margin in the junction temperature of the LED element 441, the light source substrate 442 may be directly fixed to the back cabinet 463. Here, a white resist is applied onto the light source substrate 442 so that the surface of the light source substrate 442 can easily successively reflects light emitted from the LED elements 441. Next, the reflection sheet 443 is attached, which has a surface with light diffusion property, is curved in the vertical direction of the screen, and has holes larger in diameter than the lens 445 so as to insert the lenses 445 therethrough. Above the reflection sheet 443, the diffusion plate 447a, a prism sheet 447b, and a diffusion sheet 447c, each having a thickness of 1.5 mm to 3 mm, are disposed. In the space (inner thickness Zd) between the light source substrate 442 and the rear surface of the diffusion plate 447a, direct light from the LED elements 441 and reflected light, which is secondary light, from the reflection sheet 443 are combined.

Next, the optical sheet group is fixed by the mold frame 461, which is made of a resin material and divided in quarters. Above the mold frame 461, the liquid crystal display panel 402 is disposed. The liquid crystal display panel 402 includes two glass substrates and liquid crystal sealed therebetween. One substrate (TFT substrate) includes thin film transistors (TFTs), drain signal lines, and gate signal lines, and the other substrate includes a color filter. The gate signal lines and the drain signal lines formed on the TFT substrate are pulled outside to be connected to a driver IC and a drain substrate on which the driver IC is mounted. On each surface of the glass substrates, a polarizing plate is adhered. The drain substrate is electrically connected to the timing control circuit for supplying the video signal via a flexible cable. Above the liquid crystal display panel 402, the upper frame 460 made of iron is attached, for blocking electromagnetic waves from the driver IC and fixing the liquid crystal display panel 402.

In order to finally complete the liquid crystal television set, the front cabinet 462 made of a resin material is attached to the surface of the upper frame 460. On the lower side of the cabinet 464, a control circuit for the LED elements 441, a timing control circuit, a power supply circuit for supplying power to the video circuit, a connection terminal to the outside, and the like are disposed, and the cover 468 for protection, which is made of a resin, is attached.

Note that, the embodiments described above are specific examples for describing the present invention, and are not intended to limit the present invention thereto.

For example, in each of the embodiments described above, the LED module 46 includes the lens 45, but the lens 45 is not always necessary when light emitted from the LED element 41 diffuses sufficiently. Further, in each of the embodiments described above, the liquid crystal display device 1 is structured to have a single light source substrate, but may be structured to have two or more light source substrates which are disposed side by side in the longitudinal direction thereof. Still further, the number and arrangement of the LED modules 46 and the fixtures 50 are not limited to the ones described in each of the embodiments described above, and an appropriate number and arrangement are intended to be determined as necessary.

In other words, while there have been described what are at present considered to be certain embodiments of the invention, it will be understood that various modifications may be made thereto, and it is intended that the appended claims cover all such modifications as fall within the true spirit and scope of the invention.

What is claimed is:

1. A liquid crystal display device, comprising:
    a liquid crystal panel having a rectangular shape, a length of the liquid crystal panel in a longitudinal direction being larger than a width of the liquid crystal panel in a width direction orthogonal to the longitudinal direction; and
    a backlight unit, which is disposed on a rear surface of the liquid crystal panel and comprises a light source substrate onto which a plurality of light sources are mounted, a reflection sheet, and a casing, wherein:
    the plurality of light sources are arranged along the longitudinal direction of the liquid crystal panel, and at least one of the plurality of light sources is disposed at a first position so as to be offset in the width direction with respect to at least another one of the plurality of light sources disposed at a second position,
    the backlight unit further comprises a lens disposed in front of a light source element of each of the plurality of light sources,
    a dimension of the lens in the width direction of the liquid crystal panel is larger than a dimension of the lens in the longitudinal direction of the liquid crystal panel; and
    a part of the lens corresponding to the light source disposed at the first position overlaps with a part of the lens corresponding to the light source disposed at the second position in the width direction of the liquid crystal panel,
    the backlight unit further comprises a fixture for fixing the light source substrate onto the casing, the fixture being disposed on a side of the offset light source in an opposite direction to an offset direction,
    the liquid crystal panel has a first region facing the light source substrate at a central portion in the width direction of the liquid crystal panel and second regions provided on both sides of the first region in the width direction of the liquid crystal panel facing the reflection sheet.

2. The liquid crystal display device according to claim 1, wherein the plurality of light sources and the fixture are disposed at positions overlapping one another in the longitudinal direction.

3. The liquid crystal display device according to claim 1, wherein
    the lens has a shape asymmetric in the width direction about an optical axis direction of the light source element.

4. The liquid crystal display device according to claim 1, wherein the plurality of light sources are arranged in two rows in the longitudinal direction so as to be disposed alternately in the width direction.

5. The liquid crystal display device according to claim 1, wherein the plurality of light sources are arranged in three rows in the longitudinal direction so as to be disposed in a wavelike fashion in the width direction.

6. The liquid crystal display device according to claim 1, wherein the plurality of light sources are arranged in the longitudinal direction so as to be offset in the width direction irregularly.

7. A liquid crystal display device, comprising:
    a liquid crystal panel having a rectangular shape, and a length of the liquid crystal panel in a longitudinal direction being larger than a width of the liquid crystal panel in a width direction orthogonal to the longitudinal direction; and
    a backlight unit, which is disposed on a rear surface of the liquid crystal panel and comprises a light source substrate onto which a plurality of light sources are mounted, a reflection sheet, and a casing, wherein:

the plurality of light sources are arranged along the longitudinal direction of the liquid crystal panel, and at least one of the plurality of light sources is disposed at a first position so as to be offset in the width direction with respect to at least another one of the plurality of light sources disposed at a second position, the backlight unit further comprises a lens disposed in front of a light source element of each of the plurality of light sources, a dimension of the lens in the width direction of the liquid crystal panel is larger than a dimension of the lens in the longitudinal direction of the liquid crystal panel, and a part of the lens corresponding to the light source disposed at the first position overlaps with a part of the lens corresponding to the light source disposed at the second position in the width direction of the liquid crystal panel, the backlight unit further includes a fixture for fixing the light source substrate and a fixing plate to each other, the fixture being disposed outside the light source substrate in a plan view, the liquid crystal panel has a first region facing the light source substrate at a central portion in the width direction of the liquid crystal panel and second regions provided on both sides of the first region in the width direction of the liquid crystal panel facing the reflection sheet.

8. The liquid crystal display device according to claim 7, wherein the lens has a shape asymmetric in the width direction about an optical axis direction of the light source element.

9. The liquid crystal display device according to claim 7, wherein the plurality of light sources are arranged in two rows in the longitudinal direction so as to be disposed alternately in the width direction.

10. The liquid crystal display device according to claim 7, wherein the plurality of light sources are arranged in three rows in the longitudinal direction so as to be disposed in a wavelike fashion in the width direction.

11. The liquid crystal display device according to claim 7, wherein the plurality of light sources are arranged in the longitudinal direction so as to be offset in the width direction irregularly.

12. The liquid crystal display device according to claim 1, wherein the fixture extends through the light source substrate at a position spaced from the offset light source in the width direction.

* * * * *